Figure 10:
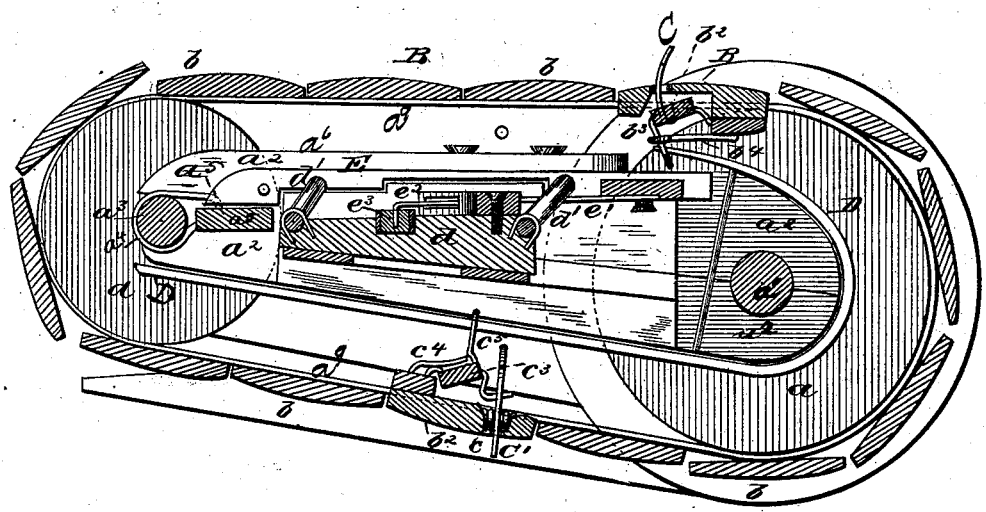

(Model.)  6 Sheets—Sheet 1.
T. J. BARLOW.
GRAIN FEEDER AND BAND CUTTER FOR THRASHING MACHINES.
No. 256,620. Patented Apr. 18, 1882.
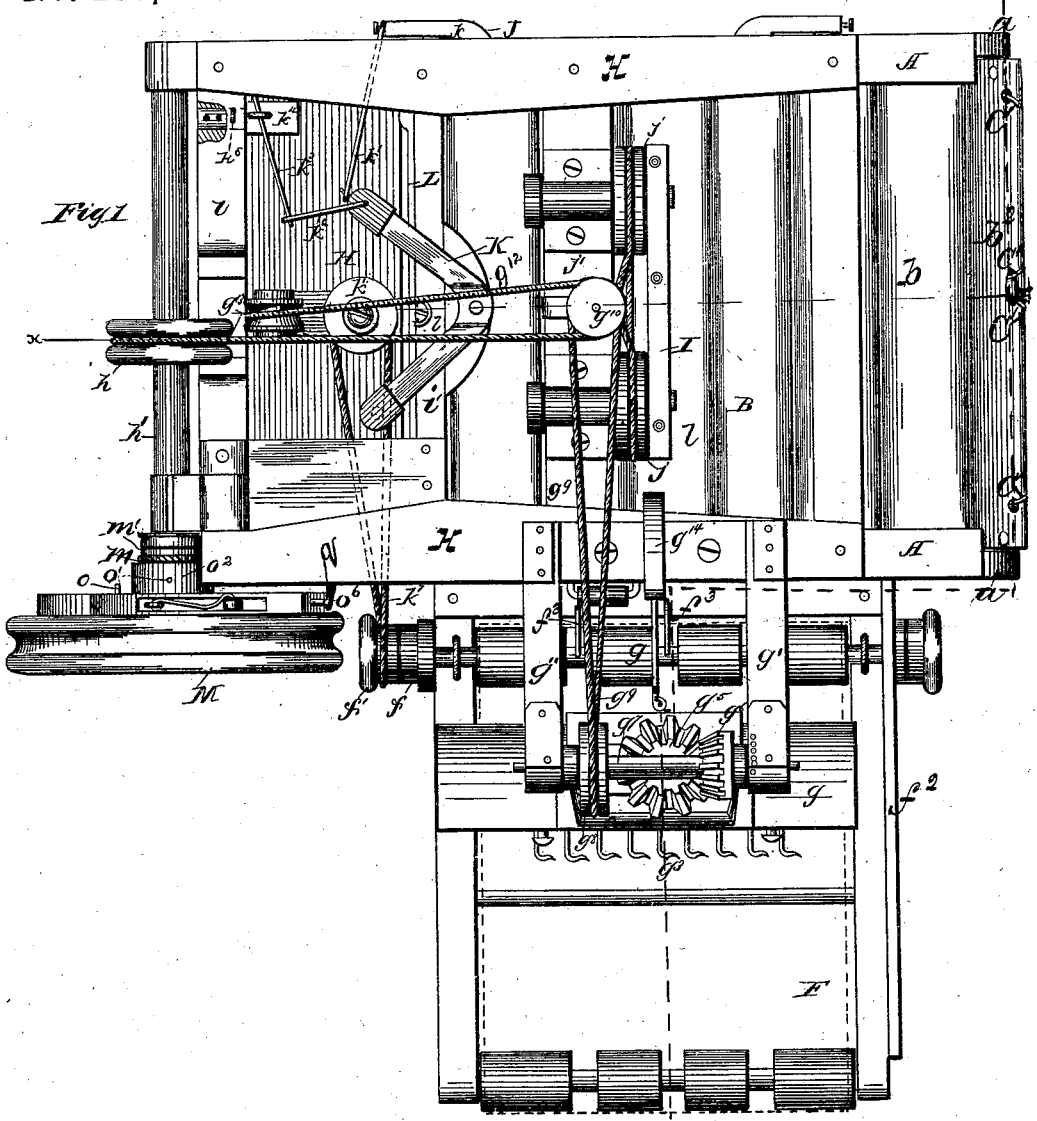
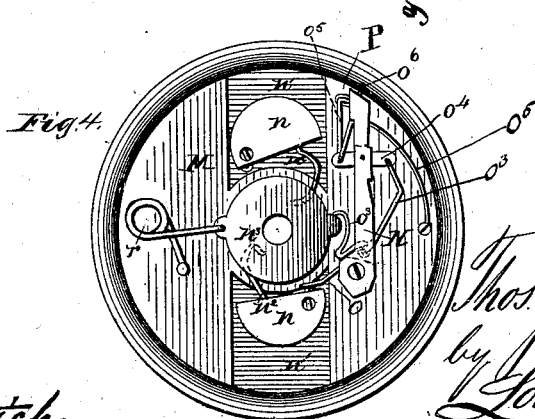
WITNESSES
Fred. G. Dieterich.
Will R. Onshundro.
Thos. J. Barlow
INVENTOR,
by Louis Bagger & Co.
Attorneys (Model.) 6 Sheets—Sheet 2.
T. J. BARLOW.
GRAIN FEEDER AND BAND CUTTER FOR THRASHING MACHINES.
No. 256,620. Patented Apr. 18, 1882.
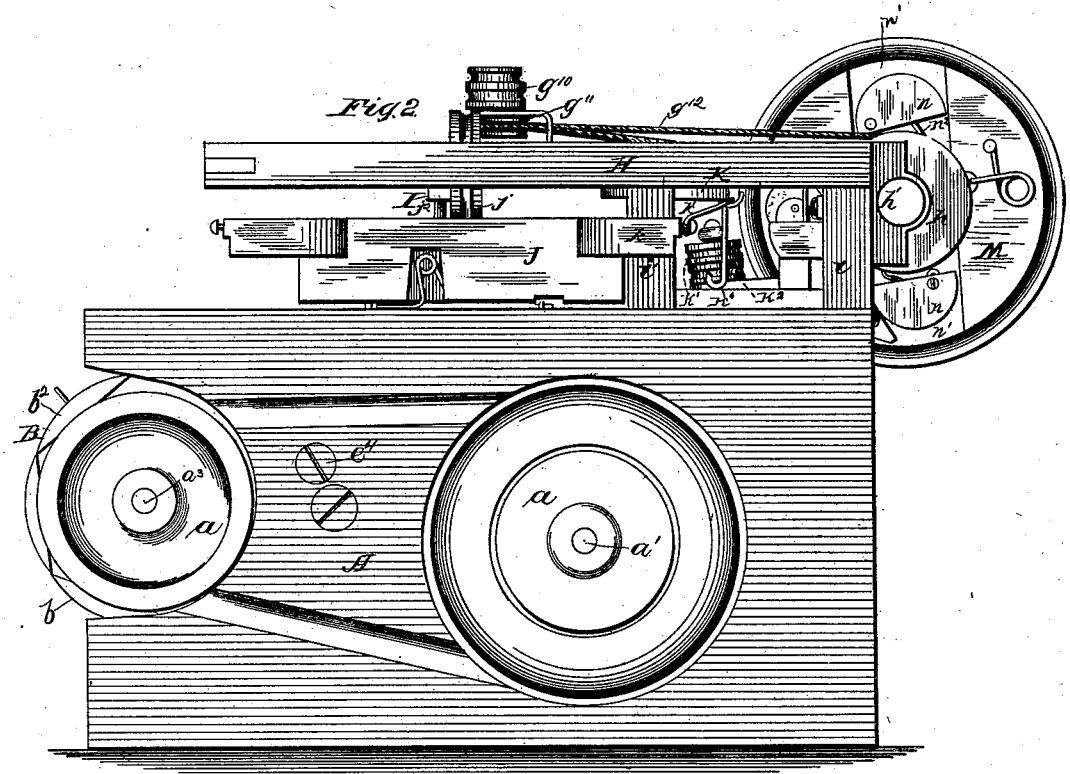
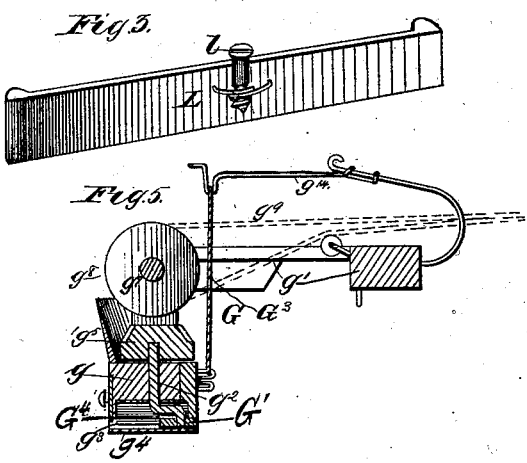
WITNESSES
Fred. G. Dieterich
Will R. Omohundro
Thomas J. Barlow
INVENTOR,
by Louis Bagger & Co.
his Attorneys
N. PETERS. Photo-Lithographer, Washington, D. C.

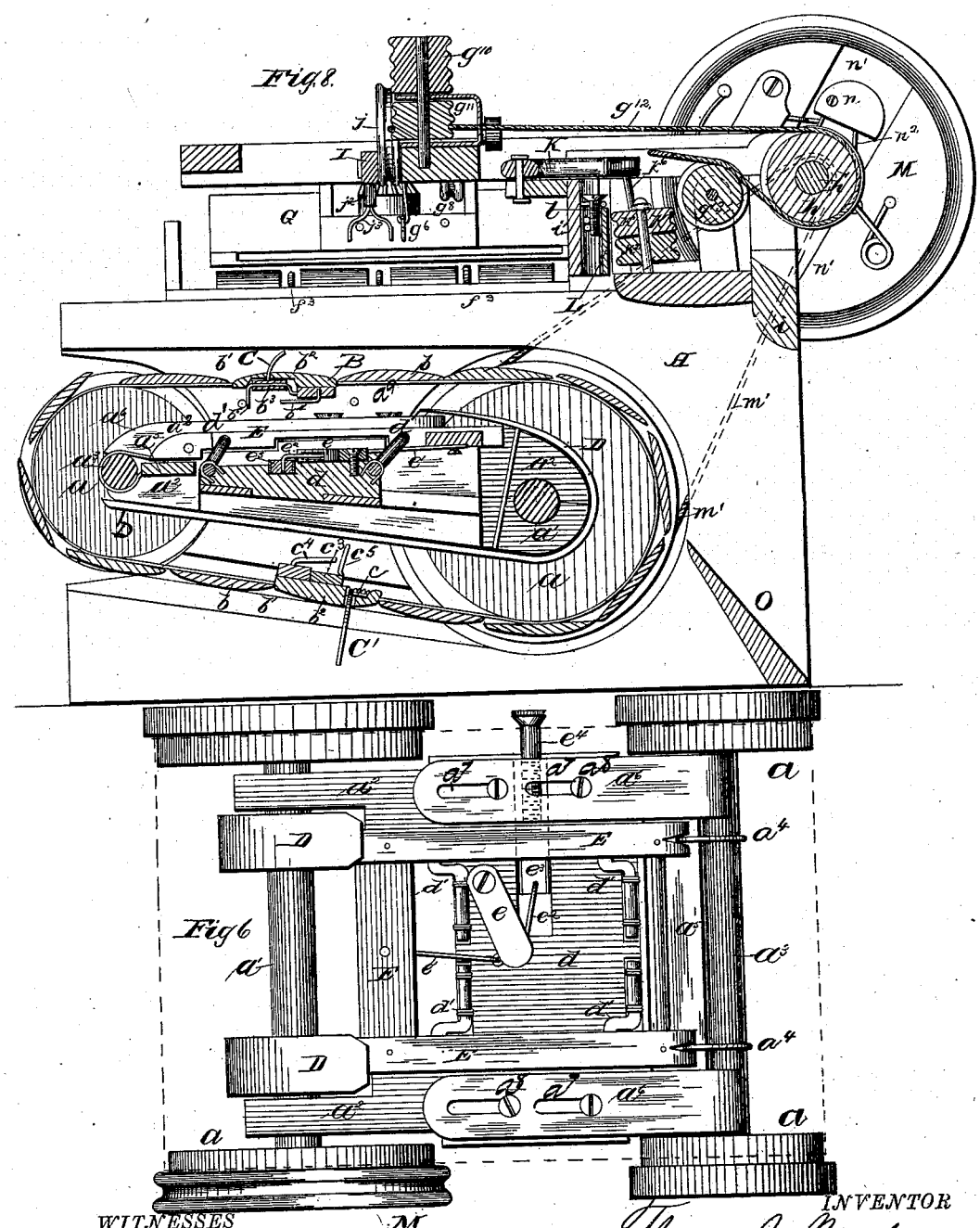

(Model.) 6 Sheets—Sheet 4.
T. J. BARLOW.
GRAIN FEEDER AND BAND CUTTER FOR THRASHING MACHINES.
No. 256,620. Patented Apr. 18, 1882.
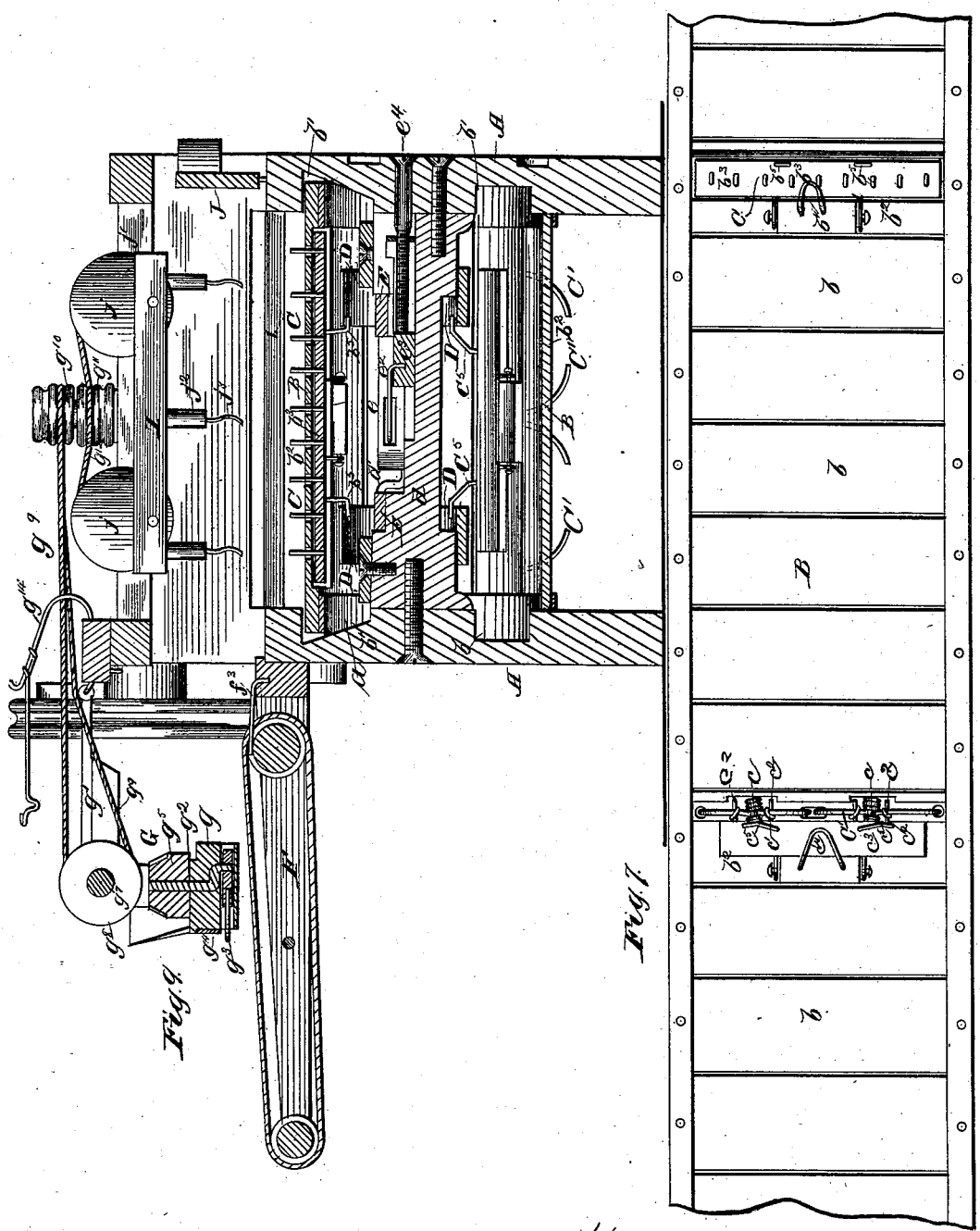
WITNESSES
Thomas J. Barlow
INVENTOR,
Louis Bagger & Co.
his Attorneys (Model.)

6 Sheets—Sheet 5.

T. J. BARLOW.
GRAIN FEEDER AND BAND CUTTER FOR THRASHING MACHINES.

No. 256,620.

Patented Apr. 18, 1882.

WITNESSES

Thomas J. Barlow
INVENTOR,
by Louis Bagger & Co.
Attorneys (Model.)
T. J. BARLOW.
GRAIN FEEDER AND BAND CUTTER FOR THRASHING MACHINES.
No. 256,620. Patented Apr. 18, 1882.
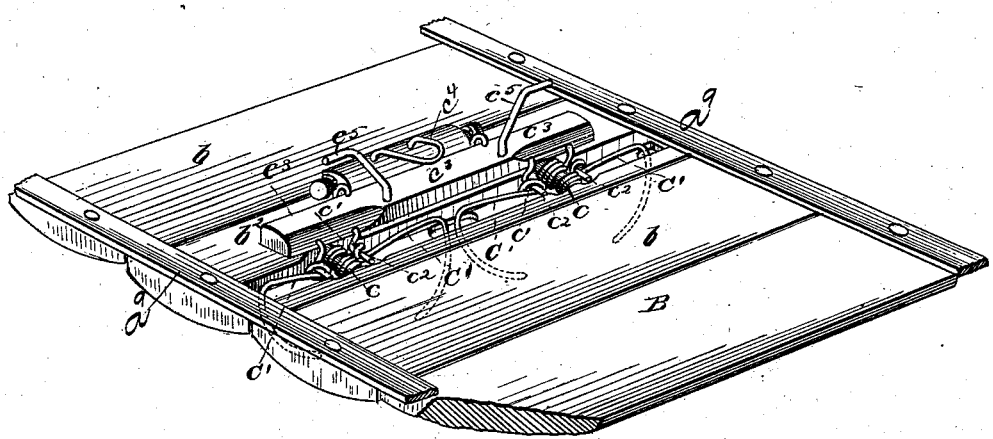
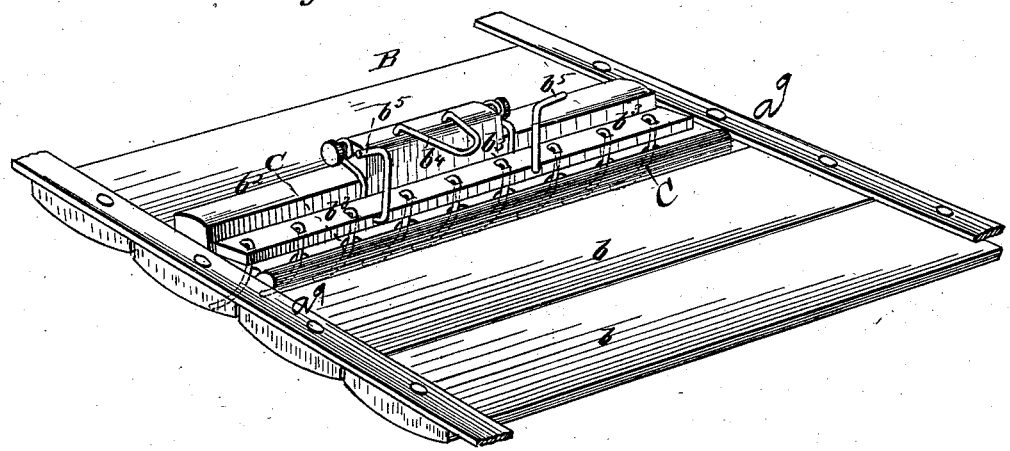

UNITED STATES PATENT OFFICE.

THOMAS J. BARLOW, OF BALD KNOB, TEXAS.

GRAIN-FEEDER AND BAND-CUTTER FOR THRASHING-MACHINES.

SPECIFICATION forming part of Letters Patent No. 256,620, dated April 18, 1882.

Application filed July 22, 1881. (Model.)

*To all whom it may concern:*

Be it known that I, THOMAS J. BARLOW, of Bald Knob, in the county of Hood and State of Texas, have invented certain new and useful Improvements in Grain-Feeders for Thrashers; and I do hereby declare that the following is a full, clear, and exact description of the invention, which will enable others skilled in the art to which it appertains to make and use the same, reference being had to the accompanying drawings, which form a part of this specification, and in which—

Figure 1 is a plan view of my improved grain-feeder for thrashing-machines. Fig. 2 is a side view, showing the check-board connected to the bell-crank checking or stopping lever. Figs. 3, 4, 5, 6, 7 are respectively details of the gage-board adjusted to operate against the bell-crank lever, supporting-board, the main driving-wheel, showing the mechanism for starting and stopping the feed apron or belt, the gavel or sheaf binding cord, wire or straw cutter, mechanism for operating the apron-teeth, and an underneath view of the two sets of teeth of the apron. Figs. 8 and 9 are respectively a longitudinal section on line $x\ x$ of Fig. 1 and a transverse section of my machine or feeder, the cross-section being taken on the line $y\ y$ of Fig. 1. Figs. 10, 11, 12, 13, and 14 are detail views thereof.

This invention appertains to improvements in grain-feeders for thrashing-machines; and it consists of mechanism for cutting the bands of the sheaves or gavels, as they are fed upon the traveling apron or belt; for controlling the feeding of the grain upon or by the apron to the thrasher; for aiding the feeding operation of the apron; for the projection and retraction of the apron-teeth; for vertically adjusting the apron-supporting frame, and for arresting the motion of the feeding-table by the action of the main or driving wheel of the feeder, substantially as hereinafter more fully set forth.

For carrying out the foregoing I have adopted the device shown in the accompanying drawings.

Referring to said drawings, A A mark side-supporting pieces, preferably adapted to receive disks or pulleys $a\ a$, one pair larger than the other pair, and arranged the larger ones at the discharge end of the machine, the smaller ones being disposed at the opposite end. These pulleys are secured one at each end of two shafts, presently referred to. The shaft $a'$ of the larger pulleys is hung transversely between upper and lower pieces, $a^2$, fastened to the inner faces of the side pieces, A. The shaft $a^3$ of the smaller pulleys is hung in staples or boxes $a^4$, fastened to a cross-piece, $a^5$, connecting the outer ends of parallel sliding or adjustable bars $a^6$, to permit the adjustment of the said shaft and its pulleys for tightening the apron encompassing the pulleys. The bars $a^6$ rest upon the bars $a^2$ and are provided with elongated slots $a^7$, which receive adjusting-screws $a^8$, to permit of their movement for the purpose above stated. The screws $a^8$ work in the bars $a^2$.

B is the endless traveling apron or belt, composed of transverse slats $b$ and $b^2$, connected each about centrally, as seen in Figs. 12 and 13, at each end to flexible belts or straps $a^9$, which permits each slat to change its relation to its fellow as it passes around the pulleys $a$, as seen in the same figures. This apron encompasses and moves upon the reduced or lesser peripheries of the pulleys $a$, and is guided in grooves $b'\ b'$ in the sides A. In the apron B are arranged, at suitable distance apart, perforated slats $b^2$, grooved out upon their inner surfaces.

C C' are series of teeth, one series projecting through each of the slats $b^2$ for the purpose of forcing along with the movement of and upon the apron the grain to facilitate or aid the feeding of the grain into the thrasher. The heads $b^3$ of the teeth C are hinged to short axes projecting from the ends of a projection of one of the slats $b^2$. To the said projection is affixed a stop, $b^4$, (see Figs. 7 and 8,) to limit the retraction of the teeth C. Arms $b^5$ are attached to the head $b^3$, and are adapted to engage with retracting ways D (see Figs. 9 and 10) as the grain is about to be passed into the thrasher, and thus withdraw the teeth from the grain at that juncture. The teeth C', each of which consists of a straight portion or shank and a curved or segmental portion, as shown, are arranged together in pairs and may take the place of the teeth C. The inner ends of the teeth C' are connected, each pair, to a common pin or fixed axis, $c$, arranged across the groove of the slat $b^2$. The inner ends of the teeth C' are provided each with a loop or eye, $c'$, into which projects a pin, $c^2$, secured to the head $c^3$ of the teeth. This head is pivoted or hinged in a similar manner as the head $b^3$ of the teeth C to its slat, and is limited in its movement by a stop, $c^4$, and likewise provided with arms $c^5$, (see Fig. 7,) to permit its manipulation by the ways D in like manner as the head of teeth C, and by which action it will be noticed that the segmental portions of each pair of teeth C' will be caused to approach or meet one another when extended through the slat, and thus grasp and carry the grain to be fed into the thrasher. By gravity the head of the teeth will fall downward when the grain has reached the point at which it is delivered into the thrasher, and thus permit the separation and withdrawal from the grain of the teeth.

D D are the ways secured indirectly to the shaft-supporting pieces $a^2$, and having their longitudinal portions inclined from the outer or smaller pulley end of the machine downwardly underneath the pieces $a^2$, and thence curved upwardly and extended to a point a little above the forward end of the apron supporting and adjusting frame E, presently described, the purpose of which will appear hereinafter.

E is the apron supporting and adjusting frame connected to a board, $d$, secured to the sides A, between the pieces $a^2$, by means of crank-shafts $d'$, adapted to allow the frame to be raised or lowered to accordingly affect the apron, as occasion may require. To conveniently operate the board $d$ a lever, $e$, is pivoted thereto to extend diagonally from the right-hand corner of the forward end of board $d$, and is connected by a link, $e'$, to the frame E, and by a link, $e^2$, to a sliding block, $e^3$, operated by a screw-bolt, $e^4$, with its head accessible from the outside of the machine. The slide $e^3$, under the action of the screw $e^4$, draws upon the lever $e$ through the rod $e^2$ when the screw is turned in one direction, or forces it back when the screw is turned in the opposite direction, according as it is desired to raise or lower the frame E.

It will be observed that the teeth-head arms $b^5$ and $c^5$, passing along upon the side pieces of the frame E, will, upon reaching the forward end of said frame, immediately drop down under the curved ends of the ways D, and thus withdraw the teeth at the proper instant from the grain being delivered into the thrasher. F is the feeding-table affixed to one side of the feeder, and having endless sectional apron or a number of such aprons encompassing grooved rolls, one of which has a fixed and a loose pulley, $f f'$. Teeth $f^3$, affixed to the end of the frame of the table F, secured to the feeding side of the machine, and projecting in grooves in the forward or inner roll of the table, permit the grain upon the table to be carried into the machine without being wasted in falling between the table and the latter.

Affixed to one side of the table is a spring, $f^2$, for the cutter to rest adjustably on.

G is the cutter for severing the binding twine, straw, or wire of the sheaves or bundles of grain placed upon the table preparatory to feeding it into the feeder. It consists of a head, $g$, hung or pivoted to a frame, $g'$, fastened detachably (for reversing it to the other side) to the feeder. It being hung in position the cutter is capable of manipulation with relation to the bundle, so as to conveniently cut its band. A shaft, $g^2$, passes through or into the head $g$, and has a crank, which connects with a bar, G', having a series or row of teeth, $g^3$. Two other cranks, $G^2 G^2$, Fig. 14, connected to the ends of the toothed bar, balance it upon the crank of shaft $g^2$. These teeth are adapted to take hold of the band of the bundle or sheaf of grain and carry it against the blade $g^4$ of the cutter, and thus sever it and permit the grain to be spread out. The tooth-operating shaft $g^2$ has a beveled pinion, $g^5$, which engages a similar pinion, $g^6$, upon a shaft, $g^7$, hung in the frame $g'$. Upon the same shaft is a pulley, $g^8$, around which passes a belt, $g^9$, driving the aforesaid gearing and shafts, in turn reciprocating horizontally the teeth $g^3$, which bring the band of the sheaf or bundle against the cutter $g^4$, severing it.

Figure 11:
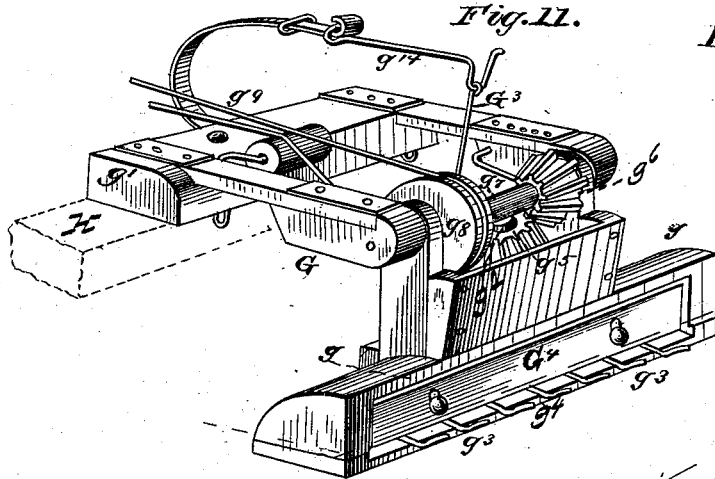
Figure 14:
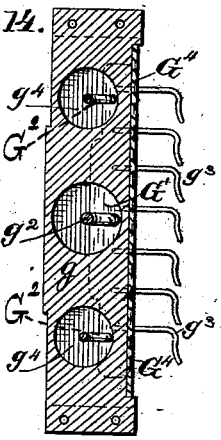

$G^4$ is a guard adjustably connected, as clearly shown in Fig. 11, to the head $g$, and arranged above the teeth $g^3$. The belt $g^9$ also passes around or receives motion from a pulley, $g^{10}$, upon a shaft, which is driven by a pulley, $g^{11}$, on same shaft, and a belt, $g^{12}$, passed around it and the pulley $h$ upon the main driving-pulley shaft $h'$. The belt $g^{12}$ passes over the idler-pulley $g^{13}$.

H is a frame fastened upon the edgewise-disposed boards $i\ i'$, the board $i$ being secured at the forward end of the machine and the board $i'$ a short distance therefrom toward the rear of the machine.

I is a rake having its head eccentrically connected near its ends to two pulleys, $j\ j$, the shafts thereof having their bearings upon a cross-bar, $j'$, of the frame H. In addition to driving the cutter-gearing the belt $g^{12}$ drives the pulleys $j\ j$, which operate the rake, the belt being crossed and passed from the pulley $g^{11}$ around the said pulleys $j$. To the head of the rake are attached pendants or arms $j^2$, having the fingers or teeth $j^3$. The rake, by the rising and falling and back and forth motion it receives from the pulleys or eccentrics $j$, pulls or rakes the grain from the table side of the feeder upon the apron well toward the middle and equally upon the opposite side of the apron. It will be noticed that the cutter is supported or connected by a cord, $G^3$, to a spring, $g^{14}$, to aid in holding it properly to the grain-bundle while cutting its binding twine, wire, or straw.

J is the check-board, detachably pivoted to the side of the machine opposite that to which the table is attached, and is capable of being reversed side for side of the machine with the table, according to the side of the machine to which it is desired to attach the feeding-table. This board is to check the operation of feeding the grain from the table upon the apron when said feeding operation becomes greater than the capacity of the apron to feed the grain into the thrasher, which checking operation of the board will more fully appear presently. One arm, $k$, of this board is connected by a rod, $k'$, to a bell-crank lever, K, pivoted upon the board $i'$. The same end of the lever is connected by a rod, $k^2$, to a spring, $k^3$, adjustably connected by a perforated sliding or adjustable bar, $k^4$, and pin $k^5$ to the board $i$, to put it under tension. The tension or pressure of the lever upon the check-board may be regulated by the adjustable bar and pin. From the opposite end of the lever K depends a hooked rod, $k^6$, which may have frictional rolls thereon.

$k^7$ is a belt driven by the double pulley K' K², (it being designed to pass a belt from the lower pulley, K², to the driving-shaft $h'$,) from thence passed around the driving-pulley $f'$ of the feeding-table. On its way to the latter pulley it passes against the outside of the frictional roll on the lever-bar $k^6$.

From the foregoing it will be seen that as the grain, should it begin to pack against the check-board J by the too rapid feeding of the table, presses against the said board it will be forced outwardly and pull upon the lever K, the opposite end of which will be moved forward. This movement of the lever will carry the rod $k^6$ in the same direction, causing it to draw upon the table-operating belt $k^7$, which will slip the latter off the fast or driving pulley of the table upon the loose pulley, and thus arrest the feeding action of the table until the pressure is taken off the check-board by the feeding out of the grain by the apron. When this takes place, the lever K returning to its normal position and the drawing action of the rod $k^6$ being removed from the belt $k^7$, the said belt will slip back upon the driving-pulley and thus again put the feeding-table into operation. The too rapid action of the feed-table is thus prevented from stopping the feeding-apron and the machine itself enabled to regulate the feeding of the grain upon the apron and from the apron into the thrasher.

L is a gage-board adjustably connected by a screw, $l$, to the board $i'$, and is capable of being vertically adjusted to vary the size of the passage between the said board L and the apron, and thus regulate the quantity of grain fed by the apron into the thrasher.

M is the main driving pulley or wheel, which receives its motion by belt, preferably from the thrasher, which motion it transmits to the apron and to the rake, the cutter, and the feed-table. Upon the shaft $h'$ of the pulley M is a loose pulley, $m$, around which passes a belt, $m'$, connecting with a pulley upon one of the apron-pulleys to communicate motion thereto. The pulley M is provided upon its inner face with two weights, $n$, which slide in slots $n'$ therein, and connected by arms $n^2$ to a disk, $n^3$. The arms $n^2$ are pivoted in slots in the disk $n^3$ to permit their entrance therein when not extended.

N is a lever pivoted at one end to the same side or face of the pulley M, the said end of the lever having a pin or projection, $o$, which engages at certain times the pin or projection $o'$ upon a disk, $o^2$, of the pulley $m$. This lever is connected to the disk $n^3$ by a wire, $o^3$, and a short lever, $o^4$, pivoted in a slot (indicated in dotted lines, Fig. 4) in the lever N. The wire $o^3$ is jointed in the slot of the lever N and connected to the outer end of the lever $o^4$. Through the other end of lever $o^4$ is looped or passed a bent wire bar, one arm, $o^5$, acting as a slide or catch engaging with an eye or staple, P, and the other arm, $o^6$, passing through a hole in and adapted to project at certain times beyond the outer end of the lever N, and engage a pin or projection, $q$, upon the side of the top frame, H. A spring, $r$, is capable of overcoming the centrifugal action of the weights $n$ by reversing the action or movement of the disk $n^3$ as the motion of the driving-pulley M is retarded.

The foregoing mechanism, which may be replaced by other and as effective mechanism, and which I reserve the privilege to do, has for its object to stop the motion of the traveling belt or apron B, which will appear more fully from the following: The wheel or pulley M being set in motion for the operation of the machine, it will be noticed that the centrifugal action will throw the weights $n$ outwardly, which will draw upon the spring $r$ and partially rotate the disk $n^3$, having the effect to actuate the short lever $o^4$, which will cause the lever N to be so acted upon as to enable its pawl or projection $o$ to engage the projection $o'$ upon the disk $o^2$ of the apron driving pulley $m$, and thus transmit the motion of the driving-pulley M to the pulley $m$ and put the apron in motion to effect the feeding of the grain into the thrasher. Simultaneously, or at the same instant, the catch $o^5$ will be withdrawn from its retaining eye or staple P and the arm $o^6$ be disengaged from the projection $q$ on the frame H.

The slackening up of the speed of the pulley M when necessary to stop the feeding of the grain into the thrasher will of course have the effect to allow the weights $n$ to be drawn inwardly by the action of the spring $r$, it reversing the position of the disk $n^3$, which will return the lever N to its former position, thus changing the position of the lever $o^4$, and consequently projecting the catch $o^5$ into its eye P and the arm $o^6$ beyond the periphery of the pulley M, and causing it to engage with the projection $q$ on frame H, arresting the motion of the pulley M and securing the lever N in a locked position.

An inclined grain-board, O, (see Fig. 8,) is affixed to the lower forward end of the feeder to conduct any falling grain into the thrasher.

I claim and desire to secure by Letters Patent of the United States—

1. The combination, with the traveling apron B, having hinged rake-heads provided with teeth capable of projection and retraction through its slots, and provided with arms projecting within the apron, of the ways D, inclined upon their lower sides, and thence curved upward and extended a short distance back upon the upper surface of the frame, supporting the apron and co-operating with the aforesaid arms of rake-head, substantially as and for the purpose specified.

2. The combination, with the apron B, having hinged rake-head provided with the teeth C, projecting through a perforated slot, $b^2$, therein, and provided with arms $b^5$ and stops $b^4$, of the ways D, having their forward ends curved upward and carried back upon the apron-supporting frame past the forward end of the latter, and adapted to engage with the aforesaid arms of the rake-head, substantially as and for the purpose set forth.

3. The combination, with the apron-supporting frame E and board $d$, of the crank-shaft $d'$, lever $e$, rods $c'$ $c^2$, the adjusting-screw $e^4$, and the slide $e^3$, substantially as and for the purpose set forth.

4. In a grain-feeder for thrashers, the combination, with the pivoted bar or board J, arranged at one side of the feeder, of the spring holding it in its vertical position, the rod $k'$, bell-crank lever K, hooked rod $k^6$, belt $k^7$, and the feed-table having one of its shafts or rolls provided with a fixed and a loose pulley, substantially as and for the purpose set forth.

5. In a grain-feeder for thrashers, the combination, with the spring check-board J, arranged at one side of the feeder, of the rods $k'$ $k^2$, lever K, spring $k^3$, hooked rod $k^6$, pulleys K' $K^2$, the belt $k^7$, and the feed-table having one of its rolls provided with a fixed pulley, $f'$, and a loose pulley, $f$, substantially as and for the purpose set forth.

6. The combination of the toothed bar G', cutter proper, $g^4$, crank-shaft $g^2$, the beveled pinions $g^5$ $g^6$, shaft $g^7$, frame $g'$, belt $g^9$, and pulleys $g^8$ $g^{10}$, substantially as and for the purpose set forth.

7. The combination, with the shaft $h'$ of the feeder, having a fixed disk provided with a pin or projection, $o'$, of the pulley M, having the weights $n$, spring $r$, levers N $o^4$, wire $o^3$, and arm $o$, substantially as and for the purpose specified.

8. The combination, with the shaft $h'$, having the disk provided with the projection $o'$, and the feeder-frame having the projection $q$, of the pulley M, having eye P, weights $n$, disk $n^3$, spring $r$, lever N, arm $o$, lever $o^4$, wire $o^3$, and catches $o^5$ $o^6$, substantially as and for the purpose specified.

In testimony that I claim the foregoing as my own I have hereunto affixed my signature in presence of two witnesses.

THOMAS JAMES BARLOW.

Witnesses:
MATTHEW DAUGHERTY,
WARREN DOUGLAS.